United States Patent [19]

Morris et al.

[11] Patent Number: 4,728,718

[45] Date of Patent: Mar. 1, 1988

[54] POLYESTERS OF TRANS-4,4'-STILBENEDICARBOXYLIC ACID, 1,6-HEXANEDIOL AND 1,4-CYCLOHEXANEDIMETHANOL

[75] Inventors: John C. Morris; Winston J. Jackson, Jr., both of Kingsport, Tenn.

[73] Assignee: Eastman Kodak Company, Rochester, N.Y.

[21] Appl. No.: 24

[22] Filed: Jan. 2, 1987

[51] Int. Cl.[4] .............................................. C08G 63/52
[52] U.S. Cl. .................................... 528/306; 528/302; 528/303; 528/304; 528/308
[58] Field of Search ............... 528/302, 303, 304, 306, 528/308

[56] References Cited

U.S. PATENT DOCUMENTS 4,551,520  11/1985  Morris et al. ...................... 528/302
4,578,453   3/1986  Jackson et al. .................... 528/302

*Primary Examiner*—Lucille M. Phynes
*Attorney, Agent, or Firm*—John F. Stevens; William P. Heath, Jr.

[57] ABSTRACT

The polyesters of 100 mol % trans-4,4'-stilbenedicarboxylic acid, 55 to 5 mol % 1,4-cyclohexanedimethanol, and 45 to 95 mol % 1,6-hexanediol can be injection-molded to give shaped objects having exceptionally high tensile strength and heat resistance. Many of the polyesters also have excellent hydrolytic stability and chemical resistance. The polyesters of this invention can be molded, extruded into film, or spun into fibers having these properties.

7 Claims, No Drawings

4,728,718

POLYESTERS OF TRANS-4,4'-STILBENEDICARBOXYLIC ACID, 1,6-HEXANEDIOL AND 1,4-CYCLOHEXANEDIMETHANOL

TECHNICAL FIELD

This invention relates to high molecular weight copolyesters which are useful as films, fibers, and molding plastics. It is particularly concerned with copolyesters from trans-4,4'-stilbenedicarboxylic acid, 1,4-cyclohexanedimethanol, and 1,6-hexanediol.

BACKGROUND OF THE INVENTION

U.S. Pat. No. 2,657,195 broadly discloses polyesters of various stilbenedicarboxylic acid isomers with glycols, aminoalcohols, and diamines. Various glycols are disclosed containing 2 to 16 carbon atoms, but copolyesters of 1,6-hexanediol and 1,4-cyclohexanedimethanol are not specifically disclosed.

U.S. Pat. No. 3,496,839 related to low molecular weight homopolymers of 4,4'-stilbenedicarboxylic acid and aliphatic glycols useful in radiation-cured cross-linked polyester coatings. 1,6-Hexanediol and 1,4-butanediol are disclosed in column 2, lines 20 to 44, in a general listing of the glycols useful in these coatings. No examples are given using a combination of 1,6-hexanediol and 1,4-cyclohexanedimethanol. Neither U.S. Pat. No. 2,657,195 nor U.S. Pat. No. 3,496,839 distinguishes one stilbenedicarboxylic acid isomer from another, i.e., 4,4'- from 3,3'- or cis- from trans-, etc.

Our own U.S. Pat. No. 4,420,607 (issued Dec. 13, 1983), U.S. Pat. No. 4,459,402 (issued Feb. 10, 1984), U.S. Pat. No. 4,468,510 (issued Aug. 28, 1984), U.S. Pat. No. 4,526,822 (issued July 2, 1985) all disclose polyesters based on trans-4,4'-stilbenedicarboxylic acid using various glycols. No examples of copolyesters based on the glycols claimed herein are specifically disclosed.

Our U.S. Pat. No. 4,551,520 discloses copolyesters based on terephthalic acid, trans-4,4'-stilbenedicarboxylic acid and 1,4-cyclohexanedimethanol.

Other patents which disclose trans-4,4'-stilbenedicarboxylic acid are Japanese Kokai 72348/74 and U.S. Pat. Nos. 2,657,194; 3,190,174; 3,247,043; 3,842,040; 3,842,041 and 4,073,777. Polyesters of trans-4,4'-stilbenedicarboxylic acid and neopentyl glycol, 1,5-pentanediol, 1,6-hexanediol, and 1,10-decanediol are disclosed by Meurisse, et al., in the *British Polymer Journal*, Vol. 13, 1981, page 57 (Table 1). Jackson and Morris disclose homopolyesters from trans-4,4'-stilbenedicarboxylic acid and various aliphatic glycols in the *Journal of Applied Polymer Science, Applied Polymer Symposia*, 41, 307–326 (1985). Our copending applications filed of even date herewith entitled "Polyesters of trans-4,4'-Stilbenedicarboxylic Acid, 1,6-Hexanediol, and 1,4-Butanediol," and "Polyesters of trans-4,4'-Stilbenedicarboxylic Acid, 1,6-Hexanediol and Ethylene Glycol" also disclose polyesters based on trans-4,4'-stilbenedicarboxylic acid.

DISCLOSURE OF THE INVENTION

The prior art discloses molding, spinning, and extruding ito film as viable processes for shaping polymers based on stilbenedicarboxylic acid. We have discovered copolyesters based on trans-4,4'-stilbenedicarboxylic acid, 1,6-hexanediol, and 1,4-cyclohexanedimethanol having a combination of good processability, excellent hydrolytic stability, excellent chemical resistance, high tensile strength, high flexural strength, high impact strength and high deflection temperature.

According to the present invention, there are provided copolyesters comprising repeating units from at least 80 mol % trans-4,4'-stilbenedicarboxylic acid, repeating units from about 55–5 mol % 1,4-cyclohexanedimethanol and repeating units from about 45–95 mol % 1,6-hexanediol, the total mol % of said acid components and said glycol components each being 100 mol %, and said polyester having an inherent viscosity of 0.3 or more determined at 25° C. in 25/35/40 (wt/wt/wt) phenol/tetrachloroethane/p-chlorophenol at a concentration of 0.1 g/100 mL.

Injection-molded bars consisting of copolyesters having repeating units from 100% trans-4,4'-stilbenedicarboxylic acid, repeating units from 55 to 5 mol % 1,4-cyclohexanedimethanol, and repeating units from 45 to 95 mol % 1,6-hexanediol have an outstanding combination of properties. The as-molded copolyesters have unobviously high heat deflection temperatures. Many of the polymers of this invention have heat deflection temperatures above 200° C. and many of the polyesters are resistant to most organic solvents including toluene, gasoline, and methylene chloride. In addition, many of the copolyesters of this invention have exceptionally good hydrolytic stability, retaining 100% of their tensile strength after exposure in boiling water for ten days.

The copolyesters disclosed in U.S. Pat. Nos. 4,459,402, 4,414,382; and 4,526,822 all have heat resistance typical of polyesters. Table 1 shows the heat deflection temperatures and tensile strengths of a number of prior art polymers. The data show that modification of the homopolymer of trans-4,4'-stilbenedicarboxylic acid (SDA) and 1,6-hexanediol (HD) with up to 55 mol % 1,4-cyclohexanedimethanol does not reduce the heat deflection temperature significantly and that it unexpectedly raises the tensile strength of 18,000 to 20,900 psi to greater than 30,000 psi. Modification of the (SDA) (HD) homopolymer with as little as 5 mol % 1,4-cyclohexanedimethanol raises tensile strength.

The polyesters of this invention are prepared from trans-4,4'-stilbenedicarboxylic acid and/or its esters, 1,6-hexanediol, and 1,4-cyclohexanedimethanol. Examples of useful esters are the dimethyl, diethyl, dibutyl, diphenyl, or any combination of these mixed esters. The copolyesters may also be prepared from glycol esters or half-ester/half-acid derivatives of trans-4,4'-stilbenedicarboxylic acid.

The trans-4,4'-stilbenedicarboxylic acid portion of the polymers may contain minor amounts of other dicarboxylic acids such as terephthalic acid, isophthalic acid, 1,5-, 1,4-, 2,6-, or 2,7-naphthalinedicarboxylic acid, 4,4'-biphenyldicarboxylic acid, and the like. The dicarboxylic acid portion of the polymer may also contain minor amounts of aliphatic dicarboxylic acids such as malonic, succinic, glutaric, adipic, pimelic, suberic, azelaic, sebacic, cis- or trans-1,4-cyclohexanedicarboxylic, or dodecanedicarboxylic acid. These polyesters may contain up to about 20 mol % of these other dicarboxylic acids such that the sum of the dicarboxylic acid components is equal to 100 mol %. Essentially pure trans-4,4'-stilbenedicarboxylic is preferred.

The glycol portion of these polymers consists essentially of 5 to 55 mol % 1,4-cyclohexanedimethanol units and 45 to 5 mol % 1,6-hexanediol units. The 1,4-cyclohexanedimethanol portion of these polymers may consist of the trans isomer or the cis isomer or any mixture thereof. A 70/30 trans/cis isomer mixture which is commercially available is preferred. The glycol portion of these polymers may also contain minor amounts, preferrably less than 20 mol %, of other glycols such that the sum of the glycol components is equal to 100 mol %. Examples of useful glycols are ethylene glycol, 1,2-propanediol, 1,3-propanediol, 2,2-dimethyl-1,3-propanediol, trans- or cis-2,2,4,4-tetramethyl-1,3-cyclobutanediol, 1,4-butanediol, 1,5-pentanediol, 1,3-cyclohexanedimethanol, or p-xylenediol.

In addition, the poly(ether-imides) such as Ultem poly(ether-imide), polyphenylene oxides such as poly(2,6-dimethylphenylene oxide) or polyphenylene oxide/polystyrene blends such as Noryl, polyesters, poly(ester-carbonates), polycarbonates such as Lexan, polysulfones, poly(sulfone-ethers), and poly(etherketones) of aromatic dihydroxy compounds may be used as blend modifiers to modify the properties of the copolyesters of this invention.

The copolyesters of this invention may contain antioxidants, conventional flame retardants such as phosphorus or halogen compounds, or fillers such as talc or mica, or reinforcing agents such as glass fiber or carbon fiber.

The inherent viscosity of the copolyesters of this invention are at least 0.3 and preferably 0.6 or more. The copolyesters are prepared in the melt or by solid-phase polymerization or by a combination of these processes.

The examples which follow are submitted for a better understanding of the invention. The examples illustrate the exceptionally high heat resistance and tensile strength is determined using the procedure of ASTM D638.

Example 1 illustrates the preparation of a polymer consisting of 100 mol % trans-4,4'-stilbenedicarboxylic acid units, 70 mol % 1,6-hexanediol units, and 30 mol % 1,4-cyclohexanedimethanol (70% trans/30% cis) units.

EXAMPLE 1

A mixture of 177.6 g (0.60 mol) dimethyl trans-4,4'-stilbenedicarboxylate, 63.7 g (0.54 mol) 1,6-hexanediol, 37.0 g (0.18 mol) 70% 1,4-cyclohexanedimethanol (70/30 trans/cis) in methanol, and 0.12 g titanium tetraisopropoxide is placed in a one-liter flask equipped with an inlet for nitrogen, a metal stirrer, and a short distillation column. The flask is heated gradually to 230°–240° C. in a Wood's metal bath to allow excess methanol to distill. The flask is heated for about 1 hr at 240° C. The temperature is raised to 260° C. for about 30 min. and then raised again to 280° C. A vacuum of 0.5 mm is applied gradually as the bath temperature is raised to 300° C. Full vacuum is maintained for about 3 to 5 min. A high melt viscosity, opaque polymer with an I.V. of 1.08 is obtained. The polymer is injection-molded at 290° C. to give test bars having a heat deflection temperature of 213° C. and a tensile strength of 31,200 psi.

The remaining examples of this invention in the table are prepared and injection-molded as described in Example 1, and the comparative examples in the lower portion of the table are prepared and injection molded as described in U.S. Pat. No. 4,468,510 (lower portion of Table 1).

TABLE 1

Heat Deflection Temperatures and Tensile Strengths of trans-4,4'-Stilbenedicarboxylic Acid Copolyesters

| Polyester Composition | | | | | Heat Deflection Temperature, °C. | Tensile Strength Psi | I.V.[b] | |
|---|---|---|---|---|---|---|---|---|
| SDA,[a] Mol %[a] | TPA,[a] Mol %[a] | NDA,[a] Mol %[a] | HD,[a] Mol % | CD,[a] Mol % | | | Initial | Final |
| 100 | — | — | 100 | — | 218 | 20,900 | 1.40 | 1.21[c] |
| 100 | — | — | 100 | — | 217 | 18,000 | 0.98 | 0.94 |
| 100 | — | — | 95 | 5 | 212 | 22,100 | 1.33 | 1.25 |
| 100 | — | — | 80 | 20 | 200 | 27,500 | 1.03 | 1.05 |
| 100 | — | — | 70 | 30 | 213 | 31,200 | 1.08 | 1.03 |
| 95 | 5 | — | 70 | 30 | 192 | 35,200 | 1.18 | 1.11 |
| 90 | 10 | — | 70 | 30 | 169 | 31,800 | 1.16 | 1.01 |
| 100 | — | — | 60 | 40 | 225 | 31,300 | 1.27 | 1.12 |
| 90 | 10 | — | 50 | 50 | 202 | 25,200 | 1.03 | 0.79[c] |
| 90 | 10 | — | 40 | 60 | 82 | 20,000 | 1.08 | 1.07[c] |
| 80 | 20 | — | — | 100 | 113 | 9,500 | 1.35 | 0.78[c] |
| 70 | 30 | — | — | 100 | 102 | 8,800 | 1.26 | 0.91[c] |
| 60 | 40 | — | — | 100 | 94 | 9,900 | 1.06 | 0.81 |
| 50 | 50 | — | — | 100 | 91 | 9,400 | 1.07 | 0.97 |
| 70 | — | 30 | — | 100 | 113 | 9,800 | 0.89 | 0.77 |
| 50 | — | 50 | — | 100 | 107 | 15,200 | 1.05 | 0.84 |

[a]SDA = trans-4,4'-stilbenedicarboxylic acid, TPA = terephthalic acid, NDA = 2,6-naphthalenedicarboxylic acid, HD = 1,6-hexanediol, CD = 70/30 trans/cis-cyclohexanedimethanol.
[b]I.V. is determined before and after molding at 25° C. in 25/35/40 (wt/wt/wt) phenol/tetrachloroethane/p-chlorophenol at a concentration of 0.1 g/100 mL.
[c]The I.V. solution contained some insoluble matter.

strengths of the copolyesters of this invention (Table 1).

All inherent viscosities are determined at 25° C. in 25/35/40 (wt/wt/wt) phenol/tetrachloroethanol/-p-chlorophenol at a concentration of 0.1 g/100 mL.

The polyesters are gound to pass a 3-mm screen, dried at 100° C. in a vacuum oven for 24 hr, and injection-molded on a 1-oz Watson-Stillman molding machine to give 5×½×⅛-in. flexure bars and 2½×⅜×1/16-in. thick D1822 Type L tensile bars. The heat deflection temperature is determined following the procedure of ASTM D648 (264 psi load), and the tensile The invention has been described in detail with particular reference to preferred embodiments thereof, but it will be understood that variations and modifications can be effected within the spirit and scope of the invention.

We claim:

1. A copolyester comprising repeating unit from at leasst 80 mol % trans-4,4'-stilbenedicarboxylic acid, repeating units from about 55-5 mol % 1,4-cyclohexanedimethanol and repeating units from about 45-95 mol % 1,6-hexanediol, the total mole % of said acid components and said glycol components each being 100 mol %, and said polyester having an inherent viscosity of 0.3 or more determined at 25° C. in 25/35/40 (wt/wt/wt) phenol/tetrachloroethane/p-chlorophenol at a concentration of 0.1 g/100 mL.

2. A copolyester according to claim 1 wherein the trans-4,4'-stilbenedicarboxylic acid is present in an amount of about 100 mol %.

3. A copolyester according to claim 1 wherein the acid component comprises up to 20 mol % of at least one other aromatic dicarboxylic acid having 8 to 20 carbon atoms.

4. A copolyester according to claim 1 wherein the I.V. is greater than 0.6.

5. A fiber comprising the copolyester of claim 1.

6. A film comprising the copolyester of claim 1.

7. A molded object comprising the copolyester of claim 1.

* * * * *